(12) United States Patent
Schlezinger

(10) Patent No.: US 11,733,178 B2
(45) Date of Patent: Aug. 22, 2023

(54) METHOD AND SYSTEM FOR INSPECTION OF PRODUCTS

(71) Applicant: Applied Materials, Inc., Santa Clara, CA (US)

(72) Inventor: Asaf Schlezinger, Modi'in (IL)

(73) Assignee: Applied Materials, Inc., Santa Clara, CA (US)

(*) Notice: Subject to any disclaimer, the term of this patent is extended or adjusted under 35 U.S.C. 154(b) by 118 days.

(21) Appl. No.: 17/162,792

(22) Filed: Jan. 29, 2021

(65) Prior Publication Data
US 2021/0262945 A1 Aug. 26, 2021

Related U.S. Application Data

(60) Provisional application No. 62/979,511, filed on Feb. 21, 2020.

(51) Int. Cl.
*G01N 21/95* (2006.01)
*G01N 21/88* (2006.01)
*G06T 7/00* (2017.01)
*G01N 21/956* (2006.01)

(52) U.S. Cl.
CPC ..... *G01N 21/9508* (2013.01); *G01N 21/8851* (2013.01); *G06T 7/001* (2013.01); *G01N 2021/95615* (2013.01); *G06T 2207/30108* (2013.01)

(58) Field of Classification Search
CPC ........... G01N 21/9508; G01N 21/8851; G01N 21/956; G01N 2021/95615; G06T 7/0006; G06T 7/0004; G06T 7/0001; G06T 2207/30108; H04N 5/23238; H04N 13/243
See application file for complete search history.

(56) References Cited

U.S. PATENT DOCUMENTS 3,914,601 A * 10/1975 Hoover ................. B07C 5/3425
                                                  209/908
5,596,865 A *  1/1997 Kramer ..................... A61J 3/10
                                                   53/111 R
(Continued)

FOREIGN PATENT DOCUMENTS

CN     101789146 A  *  7/2010
CN     108296182 A  *  7/2018
(Continued)

OTHER PUBLICATIONS

T. Murai, M. Morimoto and K. Fujii, "A Visual Inspection System for Prescription Drugs," 2012 Fifth International Conference on Emerging Trends in Engineering and Technology, 2012, pp. 13-18, doi: 10.1109/ICETET.2012.29. (Year: 2012).*

(Continued)

*Primary Examiner* — Michael Robert Cammarata
(74) *Attorney, Agent, or Firm* — Patterson + Sheridan, LLP

(57) ABSTRACT

Embodiments of the present disclosure are directed to a system and method for the inspection of products, such as tablets, pills, capsules, caplets, softgels, and other discreet units of consumption that may be ingested by a user. In embodiments, a plurality of cameras are used to capture images of the surface of the product. The images are aggregated to a single file and the imaged product features are analyzed for compliance to a product standard.

22 Claims, 2 Drawing Sheets

(56) References Cited

U.S. PATENT DOCUMENTS

| | | | |
|---|---|---|---|
| 5,600,437 A * | 2/1997 | Erdentug | B07C 5/10 |
| | | | 356/237.1 |
| 9,272,796 B1 * | 3/2016 | Chudy | G01N 21/9508 |
| 2005/0007588 A1 * | 1/2005 | Tarozzi | G01N 21/9508 |
| | | | 356/337 |
| 2008/0000979 A1 * | 1/2008 | Poisner | G16H 20/13 |
| | | | 235/462.01 |
| 2009/0026373 A1 * | 1/2009 | Mertens | B30B 11/005 |
| | | | 73/149 |
| 2009/0055116 A1 * | 2/2009 | Chen | G01N 21/9508 |
| | | | 702/82 |
| 2009/0314944 A1 * | 12/2009 | Evans | G01N 21/3581 |
| | | | 250/341.8 |
| 2014/0319351 A1 * | 10/2014 | Yamada | G01N 21/8901 |
| | | | 250/339.02 |
| 2016/0005160 A1 * | 1/2016 | Ito | G06K 9/6201 |
| | | | 348/86 |
| 2017/0219497 A1 * | 8/2017 | Shin | G01N 21/9009 |
| 2017/0305589 A1 * | 10/2017 | Yuyama | G06Q 20/4014 |
| 2018/0037353 A1 * | 2/2018 | Franzaroli | B65B 11/585 |
| 2019/0083361 A1 * | 3/2019 | Imai | A61J 3/00 |
| 2020/0260065 A1 * | 8/2020 | Peeters | H04N 13/239 |
| 2020/0319117 A1 * | 10/2020 | Boissonneault | G01V 8/20 |
| 2021/0035288 A1 * | 2/2021 | Liu | G01N 21/31 |
| 2021/0052468 A1 * | 2/2021 | Whittier | G01N 21/9508 |
| 2022/0230275 A1 * | 7/2022 | Hohjoh | G06T 5/006 |

FOREIGN PATENT DOCUMENTS

| | | | | |
|---|---|---|---|---|
| EP | 0172663 | A2 * | 2/1986 | |
| EP | 1647487 | A1 * | 4/2006 | B65B 35/58 |
| EP | 3081500 | A1 * | 10/2016 | B65B 57/14 |
| GB | 2486098 | A * | 6/2012 | G01N 21/3581 |
| JP | 63163259 | A * | 7/1988 | G01N 21/9508 |
| JP | 2000171409 | A | 6/2000 | |
| JP | 2000171409 | A * | 6/2000 | |
| JP | 2003063642 | A * | 3/2003 | |
| JP | 2004338848 | A * | 12/2004 | |
| JP | 2005125000 | A * | 5/2005 | |
| JP | 2005227257 | A | 8/2005 | |
| JP | 2015068668 | A | 4/2015 | |
| JP | 2020165843 | A * | 10/2020 | |
| KP | 20170124509 | A | 11/2017 | |
| KR | 101669596 | B1 * | 10/2016 | |
| KR | 102420747 | B1 * | 5/2018 | |
| WO | WO-2018064095 | A1 * | 4/2018 | B65B 1/02 |

OTHER PUBLICATIONS

Možina, M., Tomaževič, D., Pernuš, F. et al. Real-time image segmentation for visual inspection of pharmaceutical tablets. Machine Vision and Applications 22, 145-156 (2011). https://doi.org/10.1007/s00138-009-0218-7 (Year: 2011).*

Abdur Rehman Riaz et al., "Tablet Inspection and Sorting Machine," International Journal of Computer Applications (0975-8887), vol. 126—No. 9, Sep. 2015, 7 pages.

Imaging Ensures Medical Pill Quality, Vision Systems Design, Dec. 1, 2002, <https://www.vision-systems.com/boards-software/article/16737943/imaging-ensures-medical-pill-quality>, 6 pages.

Medical Expo, Inspection System, https://www.medicalexpo.com/medical-manufacturer/inspection-system-27756.html, 1 page.

FSi™ Machine Vision, Tablet, Capsule, and Pill Inspection Systems, https://fsinet.com/pill-inspection-systems.htm, 3 pages.

PCT/US2021/015645, International Search Report and Written Opinion dated May 18, 2021, 6 pages.

* cited by examiner

METHOD AND SYSTEM FOR INSPECTION OF PRODUCTS

CROSS-REFERENCE TO RELATED APPLICATIONS

This application claims benefit of U.S. provisional patent application Ser. No. 62/979,511, filed Feb. 21, 2020, which is herein incorporated by reference.

BACKGROUND

Field

Embodiments of the present disclosure generally relate to a method and system for product inspection, and more particularly to a method and system for the inspection of drug and supplement delivery products such as tablets, capsules, pills, caplets, and softgels.

Description of the Related Art

Tablets, capsules, pills, caplets, and other products to aid the ingestion of medications, supplements, or other drugs to users are commonplace. To ensure the proper, and safe, preparation of these devices, there is an entire segment of the pharmaceutical industry focused on the preparation of the substances composing these devices, the formation of the substance into the device, and inspection of the resulting devices.

In a typical tablet manufacturing facility, rooms housing a tablet press (or concomitant formation machinery for pills, capsules, caplets, and the like) are kept intentionally small for ease of minimizing particulate contamination, and modularity of the manufacturing facility, among other concerns. As a result, these rooms will be large enough for the tablet press and its operator, and little else.

For some medicinal and/or supplement products, inspections may be done for quality assurance or as a requirement of government or industry regulations. In prior approaches, devices for the inspection of tablets, pills, capsules, caplets, and the like are separate from the machines used to fabricate these products. Typically inspection machines are too large to place in the same room as the machinery (e.g., tablet press) used to fabricate the products. As a consequence, many of these products are not inspected unless required, even if inspection could prove useful for manufacturing facility operation. Where an inspection is performed, the products are moved to another room dedicated to that purpose, which in some cases is an inspection-dedicated room in another building, requiring product transport.

Products are transported in batches to inspection-dedicated rooms after a run is complete, resulting in the notification of a fault to the facility operator only after an entire batch has been processed. As a result, a faulty machine upstream from the inspection machine may result in partial or entire batch rejection, with the same upstream machine fault affecting later-processed batches. Additionally, because the inspection is carried out on a separate machine, and typically at a separate location, additional personnel are required to operate the inspection system.

What is needed is a system and method for the inspection of tablets, pills, capsules, caplets, softgels, and the like, that is sufficiently compact so as to be co-located with the fabrication machinery and operated by the same user, such that inspections may be performed at the same time the product is manufactured.

SUMMARY

Embodiments of the disclosure generally include a system for inspection including a product dispenser configured to dispense a product of a serially dispensed plurality of products along an inspection path and a plurality of cameras positioned about, and having a field of view including, the inspection path such that each of the plurality of cameras simultaneously capture an image of the product, such that each surface of the product is captured in at least one of the simultaneously captured images. The system further includes a processing system comprising a memory and a processor containing computer readable instructions for aggregating the simultaneously captured images of the product into a single file, parsing the single file to extracting physical features of the product, and comparing the physical features of the product to physical features of a product standard to create a comparison file.

Embodiments of the disclosure generally include a method for inspection including dispensing a product from a product dispenser, along an inspection path, positioning a plurality of cameras about, and optically coupled to, the inspection path, and capturing multiple images of the product substantially simultaneously with each camera of the plurality of cameras, such that each surface of the product is captured in at least one of the multiple images. The method further includes aggregating the multiple images of the product into a single file, parsing the single file to extracting physical features of the product, and comparing the physical features of the product to physical features of a tablet standard to create a comparison file.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
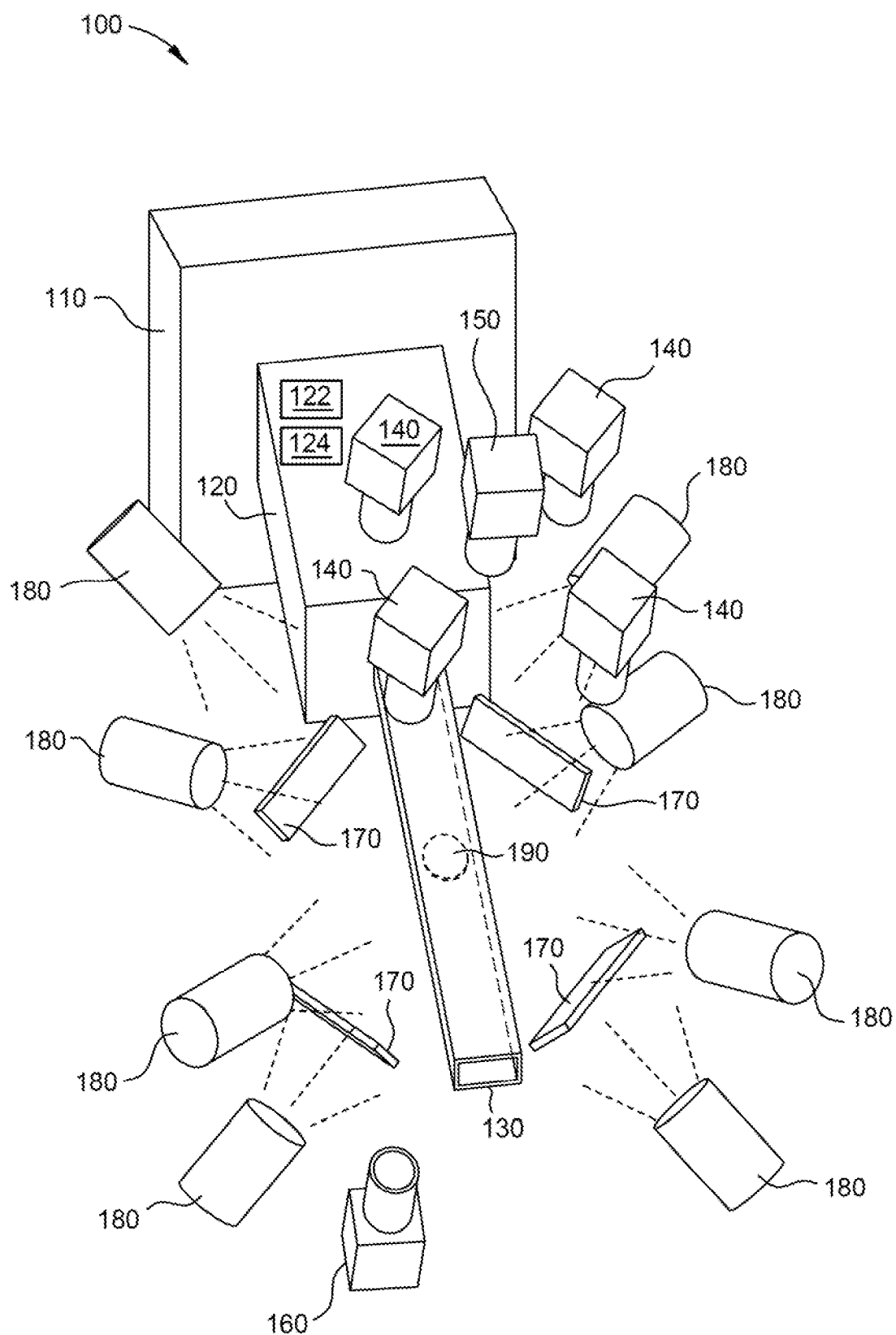
FIG. 1 a perspective view of a system for product inspection according to disclosed embodiments.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, a reference to "the disclosure" shall not be construed as a generalization of any inventive subject matter disclosed herein and shall not be considered to be an element or limitation of the appended claims except where explicitly recited in a claim(s).

Embodiments of the present disclosure are directed to a system and method for the inspection of products, such as tablets, pills, capsules, caplets, softgels, and other discreet units of medication that may be ingested by a user. In this context, 'medication' or 'medicinal' is not meant to be limiting, as any substance intended for ingestion that may be formed into a discrete unit of consumption may be used with the disclosed systems and methods. For example supplements, vitamins, candy, nootropics, or other drugs or substances that may be formed to discrete consumption units may be inspected with the systems and methods disclosed herein. Moreover, other types of products may be so inspected, including non-consumables such as parts intended for assembly into larger products, as well as entirely formed products of any material. For example, medical devices such as hypodermic needles, ampules, stents (or stent components), stethoscope components; machinery, automotive, and/or electronic components; food components and/or products; agricultural components and/or products; or other discrete component or assembly, may be inspected by systems and methods disclosed herein.

Embodiments disclosed herein include a dispenser for serially dispensing a product for inspection along an inspection path that is defined by a travel trajectory of the dispensed product. Disposed about the inspection path is an array of cameras, each synchronized to simultaneously capture an image of the product such that the combination of the images captures the entire surface of the products. To facilitate compactness of the camera array are one or more mirrors disposed along the inspection path to enable a plurality of the cameras to be grouped together such that one or more of the plurality of cameras capture the product image via the one or more mirrors.

Additionally, one or more inspection illuminators may be disposed along the inspection path, illuminating the product as the cameras capture the images of the products.

In some embodiments, the illuminators and cameras may be configured to use visible light to capture product images, while in other embodiments, different wavelengths may be used (e.g., ultraviolet, infrared) to capture potential surface anomalies of the product as it passes along the inspection path. In other embodiments, the illuminators and cameras may be configured to use multiple wavelength types.

By configuring the disclosed inspection systems and methods in such a compact manner, the inspection system may be placed within the same room as the product fabrication equipment, enabling real-time inspection of products by a single operator. This enables a number of benefits, including early detection of product flaws (i.e. chipped or cracked tablets, faults in tablet coating, and the like) to prevent further production of faulty product; reduction in operational personnel as production and inspection can be operated by the same person; higher quality factory output as all products may be inspected in real time as opposed to limited inspection of prior approaches based on regulation.

Example System for Inspection of Products

FIG. 1 depicts a perspective view of a system 100 for product inspection according to disclosed embodiments.

System 100 includes a product fabricator 110 for the creation of products 190. In some embodiments, product fabricator is a tablet press, while other embodiments include fabrication systems for capsules, pills, caplets, softgels, or other discrete units of medication or supplements. Coupled to the product fabricator is a product dispenser 120 that is configured to serially dispense products 190 along an inspection path 130. In embodiments, the product dispenser 120 receives products from the product fabricator 110 and arranges each of the products into a single file so that they may be dispensed one-by-one to the inspection path 130. In some embodiments product dispenser 120 includes a vacuum 122 and hopper 124 to facilitate serial dispensation of the products on the inspection path 130.

In some embodiments, the inspection path 130 is only defined by the travel trajectory of the dispensed product and not physically defined by any structure, while in other embodiments inspection path 130 may be physically defined by a tube having a rectangular, circular, triangular, polygonal, or other cross section, of a transparent material such as glass or plastic, silicon, quartz, or other material transparent to a light wavelength employed by cameras and illuminators described below. The tube, if present, may physically define all sides of the inspection path 130, and in some embodiments may define one or more surfaces of the inspection path 130. In embodiments having a physical tube, the tube may be inclined at an angle to enable the product to travel through the tube, and in some embodiments is vertically inclined.

System 100 further includes an array of cameras, the array including a top view camera 140, side view cameras 150, and a bottom view camera 160, disposed about the inspection path. Each camera of the array of cameras is positioned to capture at least a portion of the surface of the product, with the array of cameras capable of imaging the entire surface of the product. In order to make for a more compact product inspection system, the cameras may be positioned to reduce the space taken up by the camera array. As shown in FIG. 1, top view camera 140 may be placed with side view cameras 15 as a group, with the bottom view camera being placed separately from the top view camera 140 and side view camera 150 group. In such an embodiment, one or more side view mirrors 140 may be placed so that cameras positioned in a group may be optically coupled to other surfaces of the product 190 than to which a particular camera may be facing.

For example, the embodiment depicted in FIG. 1 shows the top view camera 140 and side view cameras 150 positioned together above the inspection path 130. In this configuration, side view mirrors 170 may optically couple the side view cameras 150 so that they may capture images of the sides of the product 190 as it travels along the inspection path.

Figure 2:
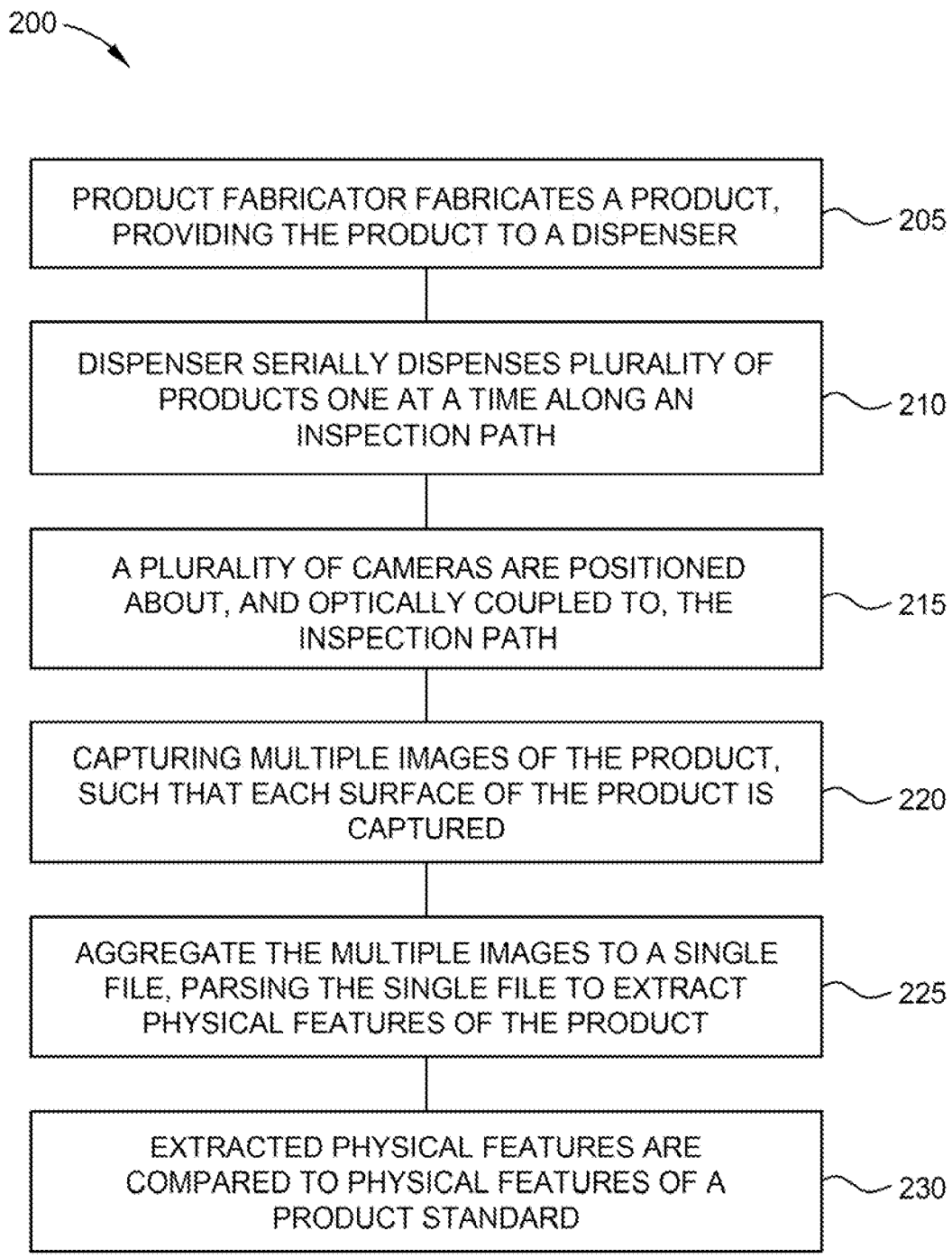
FIG. 2 depicts a method for product inspection according to disclosed embodiments.

Although the configuration of FIGS. 1 and 2 show the top view camera 140 and side view cameras 150 positioned above the inspection path 190, and bottom view camera positioned below, the cameras may be positioned in any location about the inspection path so that as a group the cameras capture the entirety of the surface of the product. In total, the multiple images captured by the cameras provide imagery for the entire surface of the product 190. For flexibility in positioning, one or more cameras may be positioned in any convenient location and coupled to the inspection path 190 via one or more side view mirrors 170. In embodiments, an actuator (not shown) may be positioned at one of the product fabricator 110, the dispenser 120, or the inspection path 130 to trigger the cameras to capture images of the product 190.

System 100 may further include one or more illuminators 180 positioned about the inspection path 130 to illuminate the product 190 as the cameras are capturing images. In some embodiments illuminators 180 may be configured to emit human-visible wavelengths of light to allow for surface inspection of the product 180, while in other embodiments different wavelengths may be utilized. For example, infrared or ultraviolet wavelengths may be used to cause particular features of a surface of the product 190 to become visible to appropriately configured cameras, while in other embodiments x-ray wavelengths may be used to inspect internal features of the product 190 as well as surface features.

System 100 further includes a processing system 195 (not shown) that receives images of the product 190 captured by the cameras. The processing system 195 aggregates the images from the cameras to a single file, parses the single file to extract the physical features of the product 190. The extracted physical features of the product, either individually or aggregated into the single file, may be compared to a standard of the product 190, with any differences between the product 190 and the standard being displayed to a user and/or stored for further review and analysis.

Example Method for Inspection of Products

FIG. 2 depicts a method 200 for the inspection of a product 190.

At 205, a product fabricator 110 fabricates a product 190, providing the product to a dispenser 120. In embodiments, the product fabricator 110 includes at least one of a tablet press and a tablet deduster.

At 210 the dispenser 120 serially dispenses a plurality of products, one at a time, providing the product 190 to an inspection path 130. As discussed above, the inspection path 130 may be a path through space in which the product 190 travels, while in other embodiments is defined by a physical material encompassing one or more sides of the inspection path 130.

At 215 a plurality of cameras is positioned about and optically coupled to the inspection path 130. In some embodiments, the plurality of cameras includes a top view camera 140, side view cameras 150, and a bottom view camera 160. In some embodiments, the cameras are positioned such that a plurality of cameras are positioned approximately opposite a single camera of the plurality of cameras, about the inspection path 130. In embodiments, one or more side view mirrors 170 may be positioned to optically couple at least one of the plurality of cameras to the inspection path 130.

At 220 multiple images of the product 190 are captured substantially simultaneously with each camera of the plurality of cameras, such that each surface of the product 190 is captured in at least one of the multiple images.

At 225 the multiple images of the product 190 are aggregated into a single file, while at 330 the single file is parsed to extract physical features of the product 190.

At 230 the physical features of the product 190 are compared to physical features of a product standard, to create a comparison file.

While the foregoing is directed to embodiments of the present disclosure, other and further embodiments of the disclosure may be devised without departing from the basic scope thereof, and the scope thereof is determined by the claims that follow.

What is claimed is:

1. A system for inspection of products from a product fabricator comprising:
   an inspection path, wherein the inspection path comprises a tube of material disposed at an incline and configured to enable products to travel through the tube, and wherein the tube of material is transparent to a light wavelength employed by at least one camera of a plurality of cameras;
   a product dispenser configured to dispense the product received from the product fabricator onto the inspection path, wherein the product dispenser is configured to be disposed proximate the product fabricator and provided with all products emanating from the product fabricator;
   wherein the plurality of cameras is positioned about, and having a field of view including the inspection path such that each of the plurality of cameras simultaneously captures an image of the product, such that each surface of the product is captured in at least one of the simultaneously captured images, wherein the plurality of cameras enable real-time inspection of the product emanating from the product fabricator, wherein the plurality of cameras include at least one of a top view camera positioned above the inclined tube, or a bottom view camera positioned below the inclined tube; and
   a processing system comprising a memory and a processor containing computer readable instructions for:
   aggregating the simultaneously captured images of the product;
   parsing the aggregated captured images to extract physical features of the product; and
   comparing the physical features of the product to physical features of a product standard to create a comparison file for early detection of physical product flaws.

2. The system of claim 1, wherein the top and bottom view cameras are positioned on opposite sides of the tube, and at least one of the top and bottom view cameras is grouped with a side view camera.

3. The system of claim 2 further comprising:
   a mirror having a field of view including the inspection path, positioned at an angle different than each camera of the plurality of cameras, and one of the plurality of cameras is optically coupled to the mirror to capture images of surfaces of the product other than which the one camera is be facing.

4. The system of claim 3 further comprising:
   an actuator configured to trigger the plurality of cameras to simultaneously capture the image of the product when the product is on the inspection path.

5. The system of claim 1 wherein the product dispenser is one of a tablet press and a tablet de-duster.

6. The system of claim 1 further comprising:
   illuminators configured to one or more of x-ray wavelengths, infrared wavelengths or ultraviolet wavelengths of light to cause particular features of a surface of the product to become visible to appropriately configured cameras.

7. The system of claim 1, wherein aggregating the captured images comprises aggregating the captured images into a single file.

8. The system of claim 7, wherein parsing the captured images comprises parsing the single file of aggregated captured images.

9. A method for inspection comprising:
dispensing a product received directly from a product fabricator along an inspection path, wherein dispensing the product along the inspection path comprises dispensing the product into an inclined tube of material configured to enable products to travel through the tube, and wherein the tube of material is transparent to a light wavelength employed by at least one camera of a plurality of cameras, the plurality of cameras including at least one of a top view camera positioned above the inclined tube, or a bottom view camera positioned below the inclined tube;
capturing multiple images of the product substantially simultaneously with each camera of the plurality of cameras positioned about, and optically coupled to, the inspection path, such that each surface of the product is captured in at least one of the multiple images, wherein the plurality of cameras enable real-time inspection of the product emanating from the product fabricator;
aggregating the multiple images of the product into a single file;
parsing the single file to extracting physical features of the product; and
comparing the physical features of the product to physical features of a tablet standard to detect physical product flaws in real-time from the fabricator.

10. The method of claim 9 wherein at least some of the plurality of cameras are positioned approximately opposite a single camera of the plurality of cameras.

11. The method of claim 10 wherein capturing multiple images of the product comprises obtaining an image of the product by one camera of the plurality of cameras through a mirror disposed at a different angle relative to the product than the one camera.

12. The method of claim 11 further comprising:
triggering the plurality of cameras to simultaneously capture the multiple images of the product when the product is on the inspection path.

13. The method of claim 9 wherein the product is dispensed from one of a tablet press and a tablet deduster.

14. The method of claim 9 wherein dispensing the product along the inspection path comprises dispensing the product along a travel trajectory of the product.

15. The method of claim 9, wherein the top and bottom view cameras are positioned on opposite sides of the tube, and at least one of the top and bottom view cameras is grouped with a side view camera.

16. A system for inspection comprising:
a plurality of cameras about, and optically coupled to, an inspection path, wherein the inspection path comprises an inclined tube of material configured to enable products to travel through the tube, and wherein the tube is transparent to a light wavelength employed by at least one camera of a plurality of cameras, the plurality of cameras including at least one of a top view camera positioned above the inclined tube, or a bottom view camera positioned below the inclined tube;
a processor configured to perform a method comprising:
dispense a product from a product fabricator along the inspection path;
capture multiple images of the product substantially simultaneously with each camera of the plurality of cameras, such that each surface of the product is captured in at least one of the multiple images;
aggregate the multiple images of the product into a single file;
parse the single file to extracting physical features of the product; and
compare the physical features of the product to physical features of a product standard to detect physical product flaws in real-time from the fabricator.

17. The system of claim 16 wherein at least some of the plurality of cameras are positioned approximately opposite a single camera of the plurality of cameras, about the inspection path.

18. The system of claim 17 further comprising:
a mirror optically coupled to the inspection path at an angle different than each camera of the plurality of cameras, and positioning one of the plurality of cameras to be optically coupled to the mirror.

19. The system of claim 18 further comprising:
an actuator configured to trigger the plurality of cameras to simultaneously capture the multiple images of the product when the product is on the inspection path.

20. The system of claim 16 further comprising one of a tablet press and a tablet deduster to dispense the product.

21. The system of claim 16 wherein dispense a product along the inspection path comprises dispense the product along a travel trajectory of the product.

22. The system of claim 16, wherein the top and bottom view cameras are positioned on opposite sides of the tube, and at least one of the top and bottom view cameras is grouped with a side view camera.

\* \* \* \* \*